(12) United States Patent
Ingenhoven et al.

(10) Patent No.: US 9,752,903 B2
(45) Date of Patent: Sep. 5, 2017

(54) HOUSING FOR A FIELD DEVICE OF AUTOMATION TECHNOLOGY

(71) Applicant: Endress + Hauser GmbH + Co. KG, Maulburg (DE)

(72) Inventors: Benjamin Ingenhoven, Mullheim (DE); Thomas Blodt, Basel (CH)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 0 days.

(21) Appl. No.: 14/969,148

(22) Filed: Dec. 15, 2015

(65) Prior Publication Data
US 2016/0183397 A1  Jun. 23, 2016

(30) Foreign Application Priority Data

Dec. 22, 2014  (DE) .................. 10 2014 119 455

(51) Int. Cl.
*G01D 11/24* (2006.01)
*G01K 1/14* (2006.01)
*G01K 1/08* (2006.01)

(52) U.S. Cl.
CPC .............. *G01D 11/24* (2013.01); *G01K 1/08* (2013.01); *G01K 1/14* (2013.01)

(58) Field of Classification Search
USPC ..................................... 174/50, 59
See application file for complete search history.

(56) References Cited

U.S. PATENT DOCUMENTS 6,927,335 B2 * 8/2005 Lim ................ H02G 3/088
174/50

* cited by examiner

*Primary Examiner* — Dhirubhai R Patel
(74) *Attorney, Agent, or Firm* — Bacon & Thomas, PLLC

(57) ABSTRACT

A housing for a field device of automation technology with a screwed connection, which connects a first housing part with an external thread with a second housing part with an internal thread. The screwed connection provides a transition impedance lessened for EMC disturbance signals. The reduction of the transition impedance is achieved by including in the screw thread a screw thread segment, in which a second screw thread type is designed in contrast to a first screw thread type located outside of the screw thread segment to provide a lessened transition impedance. Besides the basic provision that the screw thread is electrically conductive at least in corresponding portions, the second screw thread type can be differently embodied, in order to achieve the lessened transition impedance. This can occur, on the one hand, by providing the second screw thread type as round threads. However, other forms of embodiment of the screw thread segment are possible.

11 Claims, 5 Drawing Sheets

HOUSING FOR A FIELD DEVICE OF AUTOMATION TECHNOLOGY

TECHNICAL FIELD

The invention relates to a housing for a field device of automation technology.

BACKGROUND DISCUSSION

In automation technology, especially in process automation technology, field devices are often applied, which serve for registering and/or influencing process variables. Serving for registering process variables are sensors integrated, for example, in fill level measurement devices, flow measuring devices, pressure- and temperature measuring devices, pH, redox-potential measuring devices, conductivity, measuring devices, etc., which register the corresponding process variables, fill level, flow, pressure, temperature, pH-value, redox-potential, and conductivity, respectively. Serving for influencing process variables are actuators, such as, for example, valves or pumps, via which the flow of a liquid in a pipeline section, respectively the fill level in a container, can be changed. Referred to as field devices are, in principle, all devices, which are applied near to the process and deliver, or process, process relevant information. In connection with the invention, the terminology, field devices, thus includes also remote I/Os, radio adapters, respectively, in general, electronic components, which are arranged at the field plane. A large number of such field devices are produced and sold by the firm, Endress+Hauser.

Depending on application, field devices must work under the most varied of environmental conditions. A basic assumption is, however, that the devices are resistant against external electromagnetic disturbing influences. This is referred to as electromagnetic compatibility, or EMC for short. The required electromagnetic compatibility of electrical measuring-, testing- and control devices is specified, for example, in the standard, DIN EN 61326. This relates, among other things, to the high-frequency region between 100 MHz and 10 GHz. An essential contribution to the electromagnetic compatibility of field devices in this frequency range is provided by the housing. To the extent that the housing is designed as a Faraday cage, the housing interior is protected against EMC disturbance signals in this frequency band. Necessary for this is that at least the housing interior or exterior surface is as conductive as possible.

If the housing is composed of a number of subcomponents, then these subcomponents must supplementally be electrically connected with one another with one another by low impedance junctions for the referenced frequency range. This holds especially for the housing lid, through which the device interior is accessible when necessary.

In the case of many housing types, the connection between housing lid and housing is implemented as a screwed connection. In choosing the screw thread type, in such case, usually the achieved force interlocking between housing and housing lid is the decisive criterion, in order, for example, to achieve a hermetic closure. In the case of metal housings, consequently, preferably triangular screw threads are used, while, in the case of plastic housings, for the purpose of sufficient stability for the force interlocking, as a rule, trapezoidal threads according to DIN 6063-2 are used.

Disadvantageous in the case of these screw thread types is, however, the insufficient transition-impedance for high-frequency electromagnetic disturbance signals between external and internal thread in the mentioned frequency range. This insufficient transition-impedance results from the skin-effect. This effect describes that high-frequency signals are conducted in an electrical conductor only near to the surface. In the case of blocky screw thread geometries such as triangular or trapezoidal threads, this leads to a high transition impedance and, thus, to poor draining of the EMC disturbance signal, so that the EMC protection function of housing is only insufficiently executed.

In contrast therewith, screw thread types with rounded thread side-form have significantly smaller transition impedances. From this point of view, round profiles under DIN 405 provide very advantageous impedance values. However, the force interlocking in the case of this screw thread type is, as a rule, extremely small.

SUMMARY OF THE INVENTION

An object of the invention, therefore, is to provide a screwed connection between two housing parts of a field device of process automation, in the case of which the screwed connection has both sufficient force interlocking as well as also a lessened transition impedance.

The object is achieved according to the invention by a housing for a field device of automation technology with a screwed connection, in the case of which the screwed connection connects a first housing part having an external thread with a second housing part having an internal thread. In such case, the external thread and the internal thread have a first screw thread type with a first thread side-form. The first screw thread type is embodied in such a manner that the external thread and the internal thread form a force interlocking, screwed connection, and the external thread and the internal thread are electrically conductive at least in corresponding portions of the surfaces.

Moreover, the external thread and/or the internal thread have/has at least one screw thread segment of at least one winding of a second screw thread type, which second screw thread type is compatible with the first screw thread type and has a second thread side-form. In such case, the second screw thread type is embodied in such a manner that the transition impedance between the two housing parts is lessened in comparison with the first screw thread type.

Compatibility in the case the two screw thread types means that the external and internal threads can be screwed together, in spite of the fact that the screw thread segments have differing thread side-forms. Necessary for this are identical inclination of the two screw thread types as well as equal inner and outer diameters.

The size of the screw thread segment is, in principle, not fixed. Depending on the total length of the thread, it can be a multiple of a winding or only a fraction of a complete winding.

In an advantageous embodiment of the invention, for the case, in which the external thread and the internal thread have the screw thread segment, the two screw thread segments lie in the screwed state at least approximately coinciding with one another. With this configuration, thus, a synergistic effect can be achieved, in which, by the oppositely lying screw thread segments with, in each case, impedance reduced screw thread form, a disproportionate lessening of the transition impedance results.

Preferably, the first housing part or the second housing part is a housing lid.

Additionally advantageous is when the first housing part and/or the second housing part are/is manufactured of a metal material. In the case of this embodiment, it is not necessary to achieve with supplemental measures an electrical conductivity of the housing interior or exterior surfaces, in order to obtain the functional principle of a Faraday cage.

Preferably, the first housing part and/or the second housing part are/is manufactured of a synthetic material, e.g. a plastic, or a composite material. In this case, it is, in given cases, necessary to embody the housing interior or exterior surface electrically conductively by supplemental measures. This can be achieved, for example, by applying a metalizing layer by means of chemical or physical gas phase deposition. The metalizing layer can also be in the form of multi-ply systems, such as, for example, nickel-chromium/copper, in the case of which the lower layer serves as a bonding layer and the upper layer provides the actual electrical conductivity. Likewise an option is that there is located above the metalizing layer another layer, which serves for oxidation or abrasion protection of the metalizing layer In an additional advantageous embodiment of the invention, the corresponding portions of the surfaces of the internal thread and of the external thread comprise a metalizing layer. This can be achieved, again, by means of chemical or physical gas phase deposition.

Preferably, the first screw thread type is a trapezoidal thread according to DIN 6063-2. This screw thread type is used, above all, in the case of plastic housings for achieving a high force interlocking. Of course, the first screw thread type can also have any other thread side-form, which leads, also in the case of other housing materials, to a high force interlocking.

Advantageously, the at least one screw thread segment of the at least one winding with the second screw thread type can lie in one of the end regions of the internal thread and/or of the external thread. This can, above all, be, from a manufacturing point of view, that position of the thread, where a screw thread segment with a second, differing thread side-form can be inserted most easily.

In an additional preferred embodiment of the invention, the second screw thread type is a round thread according to DIN 405. This edge lacking, screw thread surface provides an improved surface conductivity, whereby the transition impedance between the two housing parts is lessened.

In an advantageous form of embodiment of the invention, the second thread side-form is embodied asymmetrically in such a manner that it has a first side, which lies in front in the screwing direction and which is rounded, and a second side, which lies behind in the screwing direction and which is flat. This asymmetric edge geometry represents a compromise of high force interlocking and reduced transition impedance.

In an additional preferred form of embodiment, the first screw thread type has on the external thread a first outer radius, which is constant, and the second screw thread type has on the external thread a first inner radius, which is constant. In such case, the second screw thread type has on the external thread a second outer radius, which is in at least one of the two end regions of the thread identical to the first inner radius and which increases along the screw thread segment of the at least one winding with a fixed slope from the first inner radius to the first outer radius. This embodiment of the second screw thread type, in the case of which the external thread chamfers toward an end of the thread, represents another embodiment for reducing the transition impedance between the two housing parts.

In an additional advantageous embodiment of the invention, the first screw thread type has on the internal thread a second inner radius, which is constant, and the second screw thread type has on the internal thread a third outer radius, which is constant. In such case, the second screw thread type has on the internal thread a fourth outer radius, which is in at least one of the two end regions of the thread identical to the third outer radius and which decreases along the screw thread segment of the at least one winding with a fixed slope from the third outer radius to the second inner radius. In the case of this additional embodiment, the second screw thread type flattens the internal thread toward an end of the thread and serves the same purpose as a flattening external thread, and leads, indeed, again, to a reduction of the transition impedance.

Of course, the invention is not limited to field devices of process automation, but, instead, is applicable to all devices, which include a screwed connection and have to have a protection function against EMC disturbance signals.

BRIEF DESCRIPTION OF THE DRAWINGS

The subject matter of the invention will now be explained in greater detail based on a number of examples of embodiments illustrated in the appended drawing, the figures of which show as follows.

DETAILED DISCUSSION IN CONJUNCTION WITH THE DRAWINGS

The figures show different forms of embodiment of the thread with reduced transition impedance. The different forms of embodiment differ, on the one hand, through the arrangement of a screw thread segment 6 within the thread. On the other hand, they differ as regards possible forms of embodiment of the second screw thread type present in the screw thread segment 6. The second screw thread type differs from the first screw thread type lying outside of the screw thread segment 6, in order to achieve transition impedance reduction.

Figure 1:
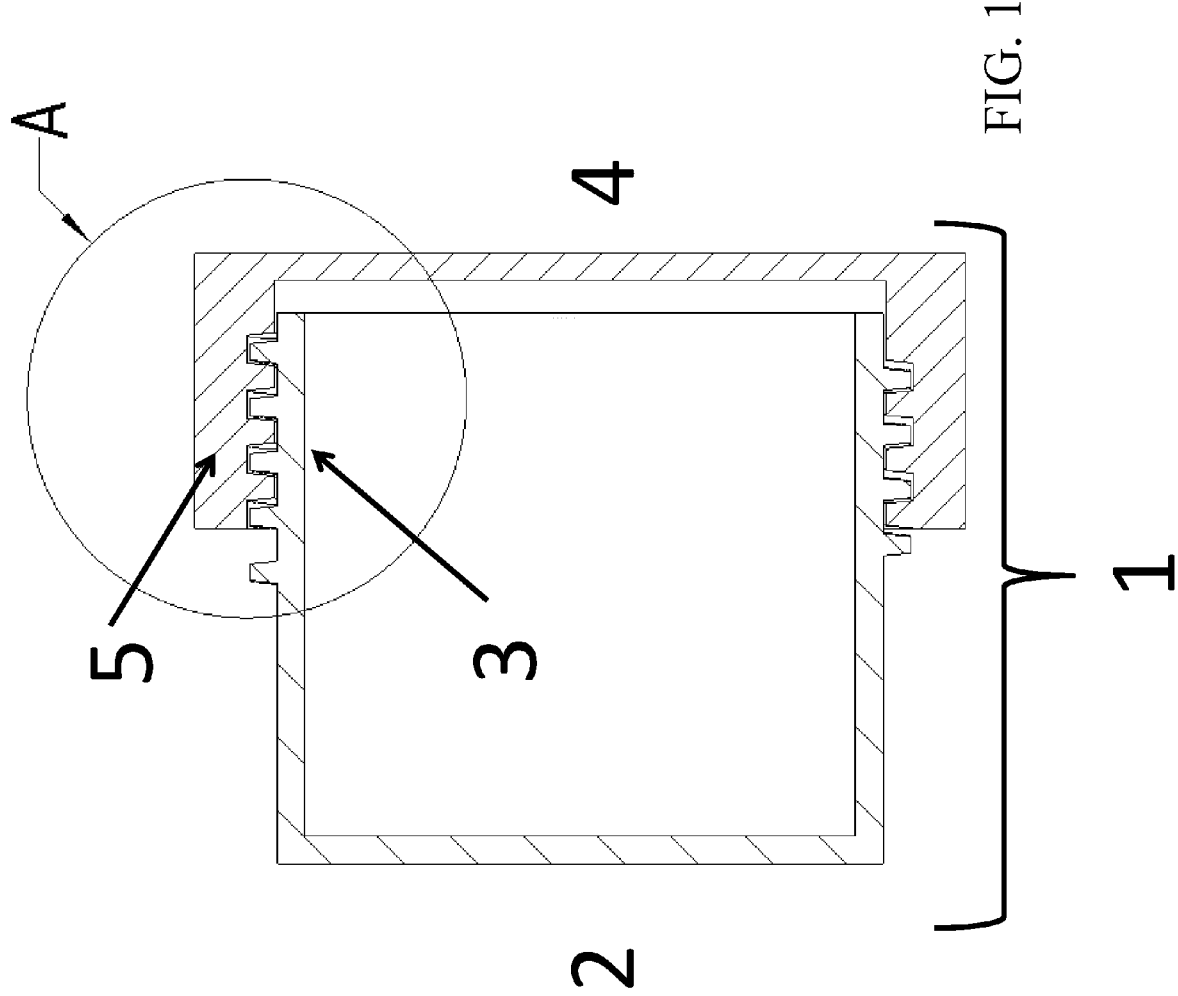
FIG. 1 is a sectional view of a housing with external thread and a housing lid with internal thread.

FIG. 1 serves mainly for showing the total picture of a housing 1 with a housing lid. In the case of this embodiment, an external thread 3 is applied on the first housing part 2. Located in a second housing part 4, the housing lid, is an internal thread 5. Also in the additional figures, FIG. 2 to FIG. 5, the internal thread 5 is located in the housing lid.

Figure 2:
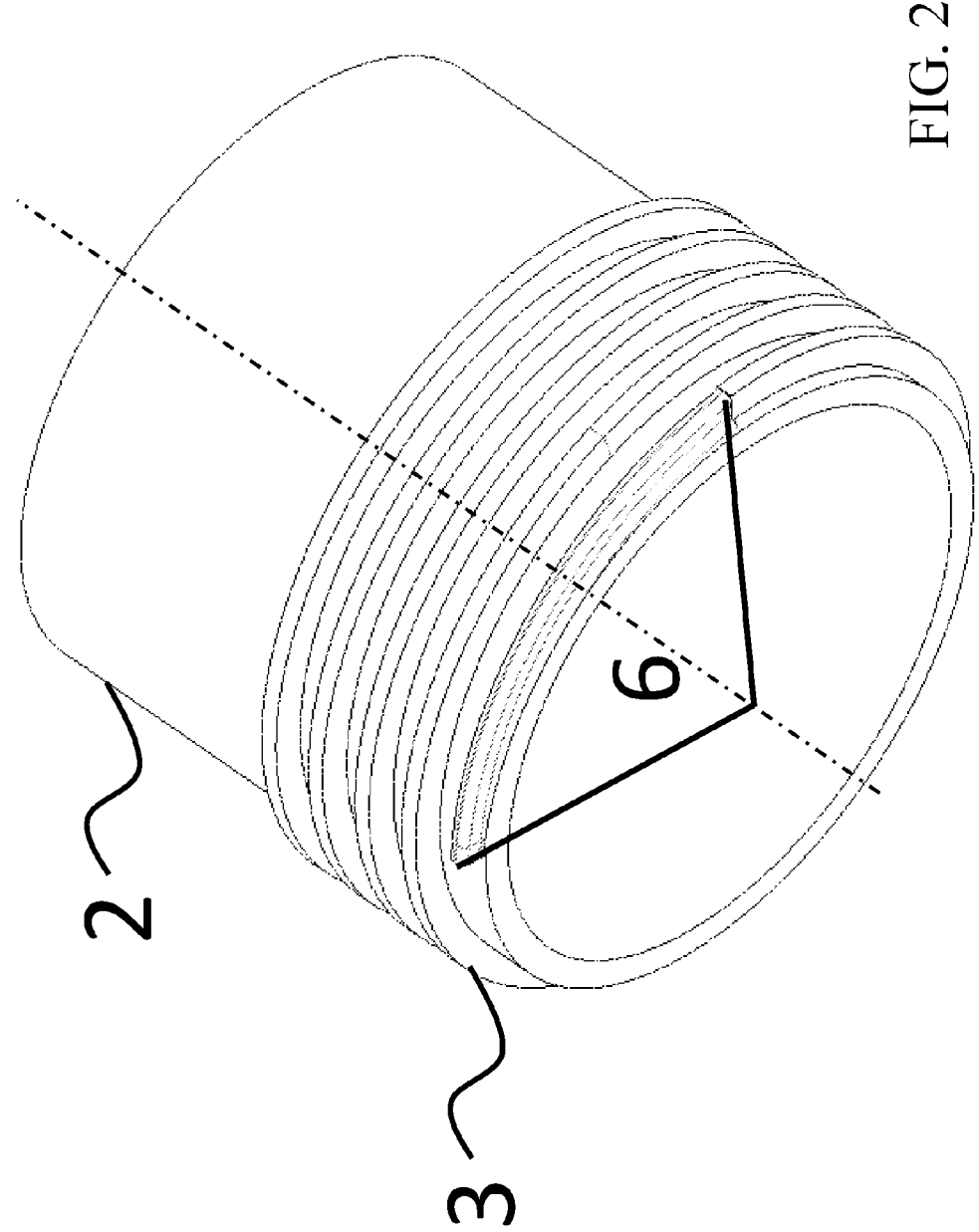
FIG. 2 is an oblique view of the external thread, in the case of which a screw thread segment extends with a round thread side-form over a one-fourth winding.

FIG. 2 shows the oblique view of the external thread 3 with a trapezoidal thread form. Additionally, one possible embodiment of the second screw thread type is shown. Thus, located on the end of the thread is a screw thread segment 6, which extends over one-fourth of a winding and has a round thread side-form. The round thread side-form lessens the transition impedance to the internal thread 5.

Figure 3:
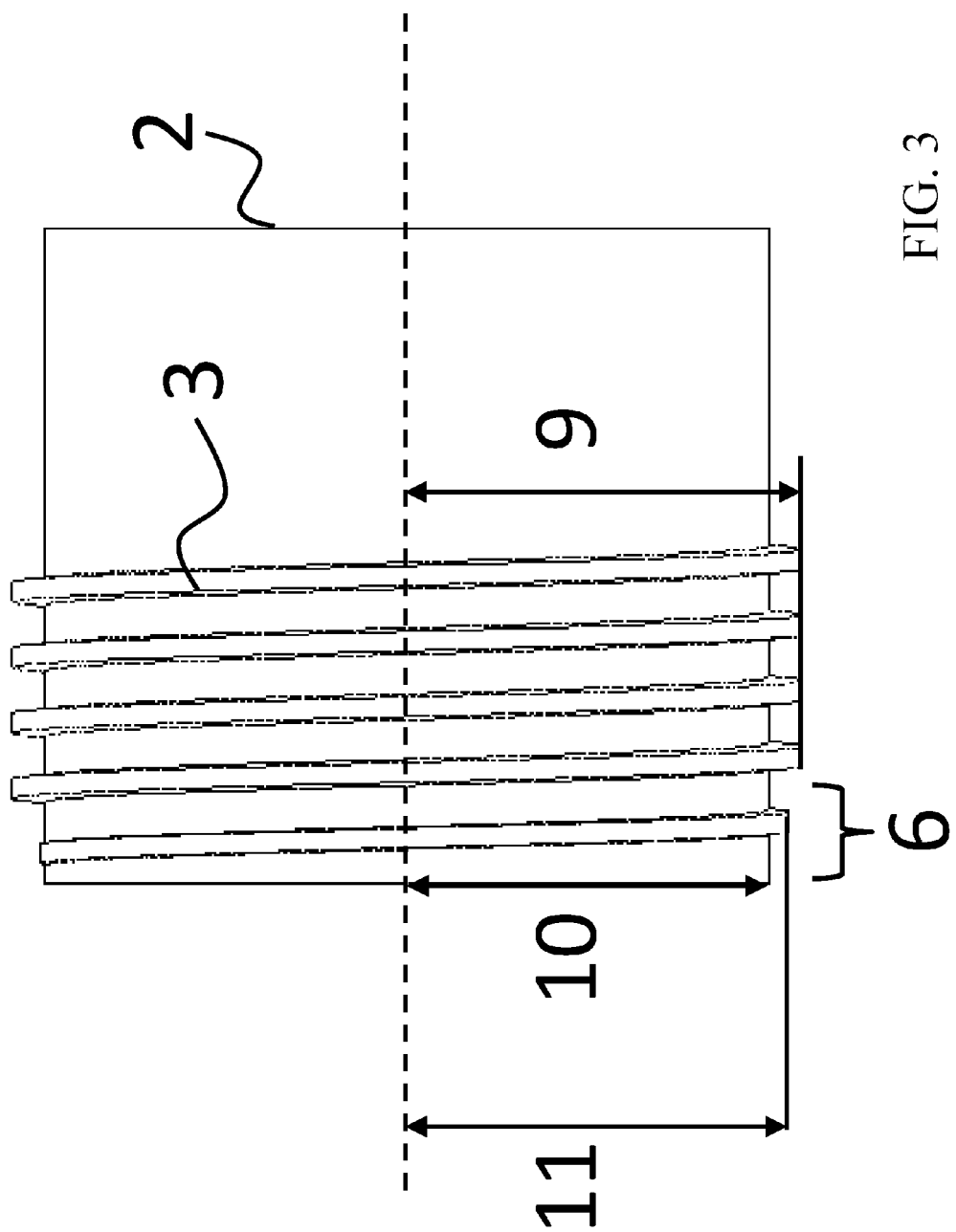
FIG. 3 is a side view of the external thread, in the case of which the screw thread segment has an outer radius lessening toward the end of the thread.

FIG. 3 shows an alternative embodiment of the second screw thread type for lessening the transition impedance. In this side view of the external thread 3, it is shown that the screw thread segment 6, again, is located on the end of the external thread 3. It includes, in this case, however, more than one winding and is, moreover, given a second outer radius 11 lessening toward the end of the thread.

Figure 4:
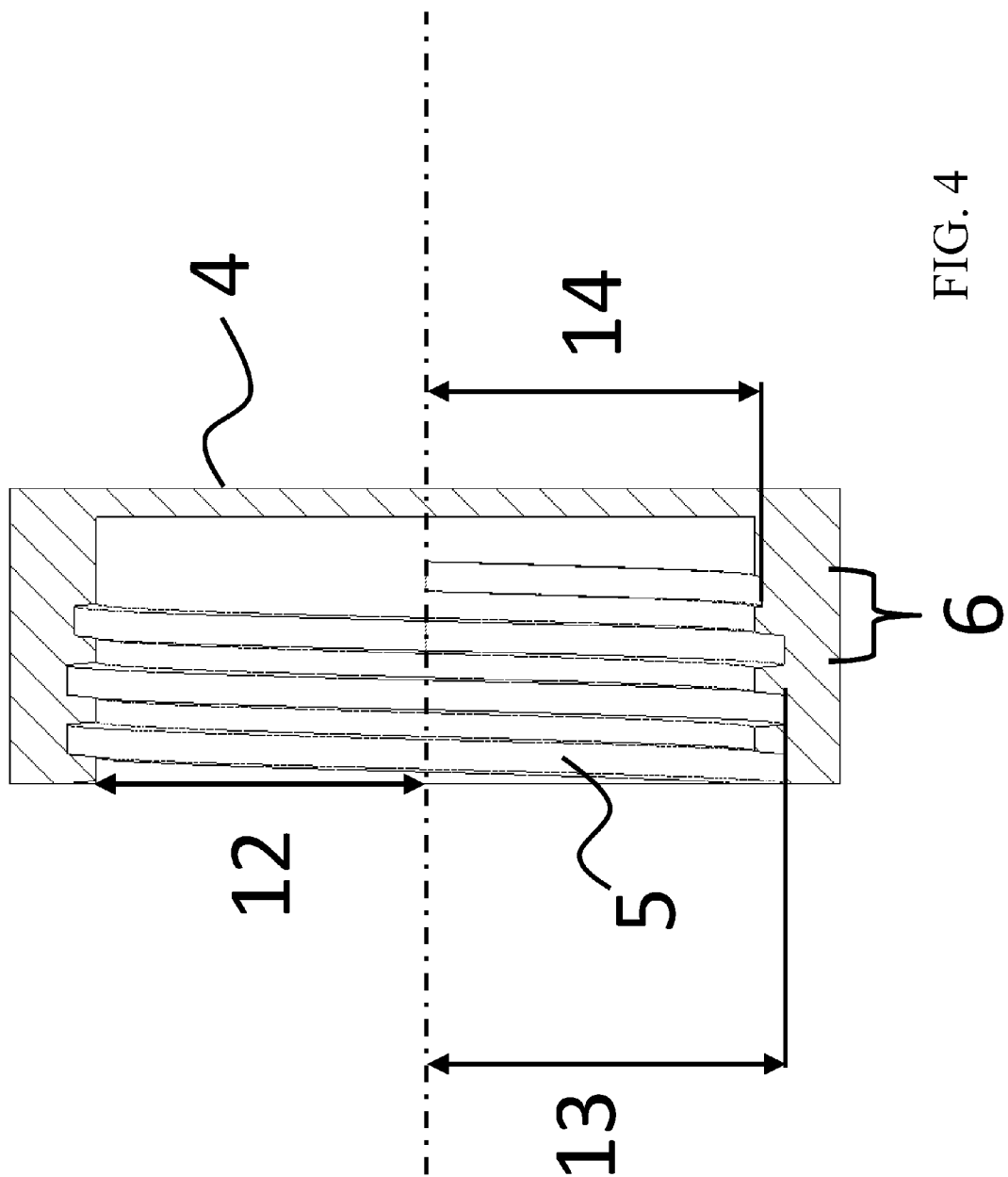
FIG. 4 is a sectional view of the internal thread, in the case of which the screw thread segment has an inner radius increasing toward the end of the thread.

FIG. 4 shows the companion of the screw thread segment 6 illustrated in FIG. 3 with lessening fourth outer radius 14. In contrast to FIG. 3, FIG. 4 shows the internal thread 5, in the end of which the screw thread segment 6 is located. Analogously to the embodiment illustrated in FIG. 3, in FIG. 4, the second screw thread type is given a fourth outer radius 14 lessening toward the end of the thread.

Figure 5:
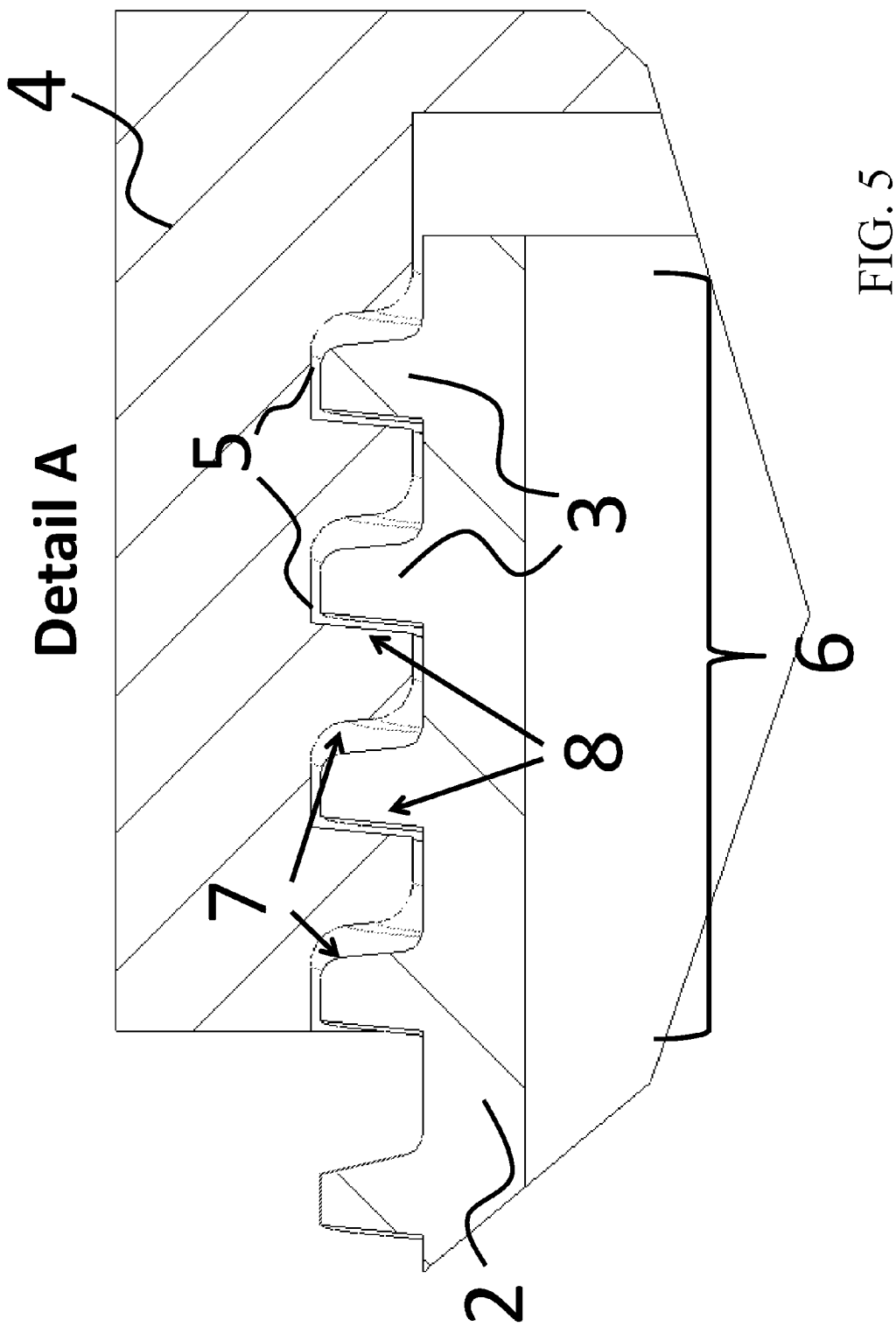
FIG. 5 is an enlarged detail view A of the thread in FIG. 1, in the case of which the screw thread segment has an asymmetric thread side-form.

FIG. 5 shows the enlarged detail A of the thread illustrated in FIG. 1. In this Fig., a form of embodiment of the second screw thread type is shown, which achieves a compromise of high force interlocking and reduced transition impedance: an asymmetric form of embodiment is provided, which has lying in front in the screwing direction a first side 7, which is rounded. Oppositely lying, thus lying behind in the screwing direction, this embodiment has a second side 8, which is flat. FIG. 5 makes clear that the second asymmetric screw thread type can be provided for the internal thread 5 and/or for the external thread 4. The screwing direction is, in this case, defined as that direction, in which the first housing part 2 with an external thread 3 moves with reference to the second housing part 4 with the internal thread 5 in the case of being screwed into the second housing part 4 with the internal thread 5, respectively in which the second housing part 4 with the internal thread 5 moves with reference to the first housing part 2 with the external thread 3 in the case of being screwed into the first housing part 2 with the external thread 3.

The invention claimed is:

1. A housing for a field device of automation technology, comprising: a first housing part with an external thread; and a second housing part with an internal thread, wherein: said external thread and said internal thread have a first screw thread type with a first thread side-form, said first screw thread type is embodied in such a manner that said external thread and said internal thread form a force interlocking, screwed connection, wherein the first screw thread type is a triangular or trapezoidal thread; said external thread and said internal thread are electrically conductive at least in corresponding portions of the surface; said external thread and/or said internal thread have/has at least one screw thread segment of at least one-fourth of a winding of a second screw thread type, which is compatible with said first screw thread type and which has a second thread side-form; and said second screw thread type is embodied in such a manner to reduce transition impedance from high-frequency electromagnetic disturbance signals between the two housing parts is lessened in comparison with said first screw thread type.

2. The housing as claimed in claim 1, wherein:
for the case, in which said external thread and said internal thread have said screw thread segment, said two screw thread segments at least approximately coincide with one another in the screwed state.

3. The housing as claimed in claim 1, wherein:
said first housing part or said second housing part is a housing lid.

4. The housing as claimed in claim 1, wherein:
said first housing part and/or said second housing part are/is manufactured of a metal material.

5. The housing as claimed in claim 1, wherein:
said first housing part and/or said second housing part are/is manufactured of at least one of the following: a synthetic material and a composite material.

6. The housing as claimed in claim 5, wherein:
the corresponding portions of said surfaces of said internal thread and said external thread comprise a metallizing layer.

7. The housing as claimed in claim 1, wherein:
said at least one screw thread segment of the at least one winding of said second screw thread type lie/lies in one of the end regions of said internal thread and/or said external thread.

8. The housing as claimed in claim 7, wherein:
said first screw thread type has on said external thread a first outer radius, which is constant; and
said second screw thread type has on said external thread a first inner radius, which is constant;
said second screw thread type has on said external thread a second outer radius, which in at least one of the two end regions of the thread is identical to said first inner radius and which increases along said screw thread segment of the at least one winding with a fixed slope from said first inner radius on said first outer radius.

9. The housing as claimed in claim 7, wherein:
said first screw thread type has on said internal thread a second inner radius, which is constant;
said second screw thread type has on said internal thread a third outer radius, which is constant; and
said second screw thread type has on said internal thread a fourth outer radius, which is in at least one of the two end regions of the thread identical to said third outer radius, and which fourth outer radius decreases along said screw thread segment of the at least one winding with a fixed slope from said third outer radius to said second inner radius.

10. The housing as claimed in claim 1, wherein:
said second screw thread type is a round thread.

11. The housing as claimed in claim 1, wherein:
said second thread side-form is embodied aymmetrically in such a manner that it has a first side, which lies in front in the screwing direction and which is rounded, and a second side, which lies behind in the screwing direction and which is flat.

* * * * *